TELEVISION RECEIVER WITH PICTURE SELECTOR DEVICE

Filed July 21, 1958

INVENTOR.
WALTER ROSENTHAL

BY

Mestern & Kollin.

ATTORNEYS

United States Patent Office 3,079,462

Patented Feb. 26, 1963

3,079,462
TELEVISION RECEIVER WITH PICTURE SELECTOR DEVICE

Walter Rosenthal, 110 W. 96th St., New York 20, N.Y.

Filed July 21, 1958, Ser. No. 749,782
5 Claims. (Cl. 178—5.8)

This invention relates to television receivers in general and to a television receiver with a picture selector in particular.

When viewing a television program received over a certain television channel it sometimes becomes desirable to ascertain the kind of programs which are being transmitted over the other channels. In such instances the viewer who is usually seated comfortably in a chair at some distance from the television receiver, is compelled to rise and walk to the latter proper, in order to shift the channel selector from one station to another to scan the type of programs being transmitted and to reset the selector switch to either the original program previously viewed or to a new program selected.

The method of selection described above entails a certain discomfort to the viewer who may have been comfortably relaxing in an arm chair at the end of a busy working day.

It is therefore a principal object of the present invention to provide means whereby the viewer of a particular television program may ascertain what other programs are being telecast without losing the continuity of the program being watched and without the necessity of rising from the chair he is seated in, thereby preventing any resulting discomfort.

It is another object of the invention to provide means whereby the television viewer upon ascertaining the programs telecast through such other channels, may switch to one of said channels without moving from the chair he is seated in.

A further object of the invention is to provide means whereby scanning and selection of television channels in a television receiver may be accomplished by remote control.

Yet another object of the invention is to provide a device answering the above purposes, which is simple in design and construction, not difficult to manufacture and which may be sold at popular prices, thereby making it accessible to the general public.

Other objects and advantages of the invention will become apparent in the course of the following description when taken in connection with the accompanying drawing, but it should be understood that these are given by way of illustration and not of limitation and that many changes in the details may be made without departing from the spirit of the invention.

Figure 1:
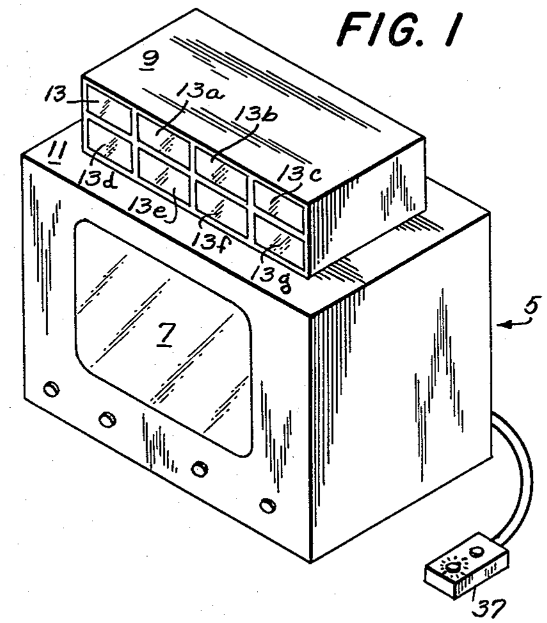
Figure 2:
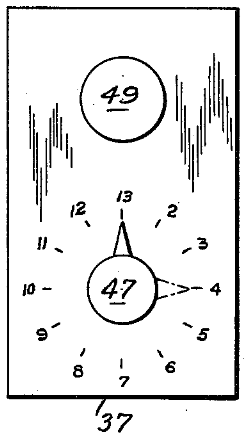
Figure 3:
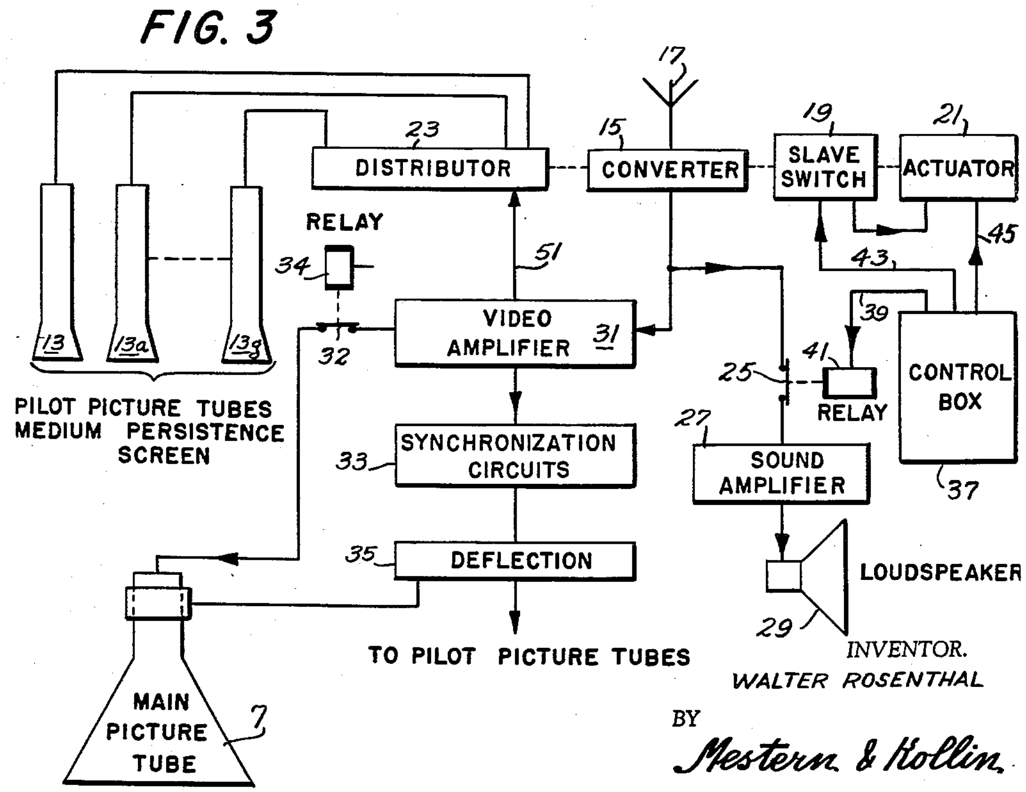

In the drawings, FIG. 1 shows a perspective view of the television receiver incorporating the device according to the invention, FIG. 2 is a plan view of the switch control box employed in the invention, and FIG. 3 is a schematic representation of the cooperating units of the device and the connections therebetween.

Referring now to drawings in detail, a conventional television receiver housing 5 having a main picture tube 7 is provided with a box or enclosure 9 which may be conveniently secured to the housing top 11.

Arranged in box 9 in two parallel superimposed rows are a number of small pilot cathode ray picture tubes 13, 13*a*, 13*b*, 13*c*, 13*d*, 13*e*, 13*f*, 13*g*. The pilot tubes are of the medium persistence screen type and may have a screen area of the smallest dimensions commercially available, such as 2, 3, or 5-inch screens.

Arranged in the receiver housing 5 is a converter 15, which is connected to a receiving antenna 17. There are further provided a slave switch 19, an actuator 21 and a distributor 23. The actuator may be either mechanical—a motor or step solenoid, or an electronic generator. The actuator, if mechanical, rotates a shaft which is common to slave switch 19, converter 15 and distributor 23.

If an electronic actuator is employed, then the slave switch, the converter slave switch, and distributor are of the electronic beam type.

The converter is connected through switch 25 actuable by relay 41 and sound amplifier 27 to loud speaker 29, and through video amplifier 31, switch 32, actuable by relay 34, synchronization circuits 33 and deflection system 35 to the main picture tube 7. The I.F. from the converter is thus passed through these units to be changed into video and sound. There is further provided exteriorly of the receiver a control box 37 which is connected by wire 39 to the relay 41 of switch 25 and by wire 43 to slave switch 19 and by wire 45 to actuator 21. Distributor 23 is connected to pilot picture tubes 13–13*g*.

Control box 37 is provided with a switch 47 for the selection of various channels and a pushbutton switch 49 for actuating actuator 21 to operate the device.

The operation of the device according to the invention is as follows:

Let it be assumed that channel 13 is being viewed. As shown in FIG. 2 the pointer of knob 47 is set opposite channel 13 and the converter correspondingly for the same channel.

The I.F. from the converter passes through switch 25 which is closed, into sound amplifier 27, into video amplifier 31, then through switch 32 into the main picture tube, switch 32 being closed. The video amplifier 31 feeds the sync. circuits 33 and the deflection system 35.

Button 49 on control box is next depressed, thereby starting actuator 21. Simultaneously relays 41 and 34 open switches 25 and 32 respectively, cutting out the sound and video on the main tube as long as button 49 is depressed.

Depressing button 49 energizes actuator 21 which rotates slave switch 19 thus continuously connecting consecutive channels in converter 15. The selector switch 47 is connected to a wafer of the slave switch 19, so that the position of switch 47 determines the position of actuator 21, when the button 49 is released. This portion of the apparatus and its interconnection are well known and are described in the publications by G. H. Leland, Inc., Dayton 2, Ohio, (Bul. 354-RS&R) Ledex Rotary Solenoids—Ledex Relays Stepping and Selective, and by C. P. Clare & Co., 3101 Pratt Blvd., Chicago 45, Illinois, "Type 11 Spring Driven Stepping Switch Sales Engineering Bulletin No. 121."

The antenna, which receives signals from the different channels, conveys these to the converter, through the I.F. to the video amplifier, which in turn feeds through the distributor via line 51 the pilot tubes in a rapid sequence of the converter and distributor.

Each tube receives video signals for ⅛ of a second at a time. The duration of the signals, of course, may be varied by presetting the actuator speed for more or less than ⅛ of a second. Each pilot tube will be scanned 4 times during the ⅛ of the second and will receive an impression sufficient to persist on the phosphorous screen while the remaining screens are being scanned. The total cycle takes place in ½ of a second or less if necessary.

The persistence factor of the phosphorous screen is of such a value that, only when the last pilot tube has been scanned, the picture on the first pilot tube fades.

During the scanning the deflection system controls all pilot tubes and the main picture tube so that the load on the deflection amplifier 35 remains the same.

The deflection action is present only as long as the tubes are supplied with video signals through the distributor, due to the sync. circuit.

Should it be desired to switch to another channel, the viewer lets the button 49 go and switches to channel 4 on remote control box 37. The relays 41 and 34 close the circuits to the loudspeaker and the main tube. At this stage channel 13 is still visible on main picture tube 7.

Switch 47 and slave switch 19 are interconnected in such a way that slave switch 19 closes the circuit to the actuator as long as the slave switch 19 does not reach the position corresponding to channel 4. During this time the slave switch 19 short-circuits pushbutton 49.

As soon as the slave switch reaches a position which corresponds to channel 4, the circuit which feeds the actuator 21 is opened and the action of the slave switch stops, and the pilot picture tubes are rendered inoperative.

While box 9 has been described as secured exteriorly of housing 5, the pilot picture tubes may be built into the receiver housing above the main picture tube 7 or about the periphery thereof in any desired manner.

Alternatively, box 9 containing the pilot tubes could be appropriately connected with the television receiver so that the box may be placed alongside the viewer's chair.

While the pilot tube unit has been described as permanently connected to the television receiver, circuit provision may be made in both the receiver and the pilot tube unit to make these detachable, so that an owner of a television receiver thus constructed could purchase a pilot picture tube unit and a switch box, which could be used by simply plugging both into a convenient outlet on the television receiver.

It is also possible to make provision in the sound circuit, whereby sound corresponding with the pictures appearing on the pilot picture tubes would be heard, a matter especially of interest to music lovers.

Having thus described the invention I claim:

1. A television receiver with a picture selector comprising, in combination, a frequency converter provided with a frequency channel selector and with an output end, a video amplifier having an input end connected to the output end of the converter, and having an output end, a sound amplifier having an input end connected to the output end of the converter and an output end, a loud speaker connected to the sound amplifier's output end, a first cut-off relay interposed between the input end of said sound amplifier and the output end of said converter, a single main cathode-ray picture tube connected to the output end of said video amplifier, a second cut-off relay interposed between the single main tube and the video amplifier for disconnecting the main picture tube from the video amplifier, synchronization and deflection means interposed between the output end of the video amplifier and the single main picture tube, a plurality of cathode-ray pilot picture tubes connected to the output end of said video amplifier and said deflection means, channel frequency distributing means having an input end connected to the output end of the video amplifier and a plurality of distributing output ends corresponding to predetermined frequencies, each of said distributing ends connected to one of the pilot picture tubes, said deflection means being also connected to said pilot tubes, said distributor means operatively connected to said channel selector, means for actuating said channel selector, and control means connected to said actuating means and to said relays, said control means adapted to disconnect said sound amplifier while consecutively connecting said pilot tubes, said control means including a switch for selecting a desired channel.

2. The receiver according to claim 1, wherein a housing is provided for said pilot picture tubes, said housing being secured exteriorly to said television receiver.

3. The receiver according to claim 1, wherein said actuating means includes a slave switch.

4. The receiver according to claim 3, wherein said actuating means is electronic.

5. The receiver according to claim 3, wherein said actuating means is mechanical.

References Cited in the file of this patent

UNITED STATES PATENTS

| | | |
|---|---|---|
| 2,135,577 | Herbst | Nov. 8, 1938 |
| 2,812,486 | Foster | Nov. 5, 1957 |
| 2,816,259 | Papitto | Dec. 10, 1957 |

FOREIGN PATENTS

| | | |
|---|---|---|
| 960,113 | Germany | Mar. 14, 1957 |

OTHER REFERENCES

"The Radio-Controlled Television Plane"; Television News March-April, 1931, vol. 1, No. 1, pp. 10, 11, 75, 76.

"Multiple Television" A Forecast, Radio News, pages 528, 529, December 1928.